(12) United States Patent
Gruenter et al.

(10) Patent No.: US 7,813,861 B2
(45) Date of Patent: Oct. 12, 2010

(54) CRUISE CONTROL DEVICE

(75) Inventors: Thomas Gruenter, Steinheim-Höpfigheim (DE); Guerol Guendogan, Kirschberg/Murr (DE)

(73) Assignee: Dr. Ing. h.c. F. Porsche AG, Stuttgart (DE)

( * ) Notice: Subject to any disclaimer, the term of this patent is extended or adjusted under 35 U.S.C. 154(b) by 623 days.

(21) Appl. No.: 11/796,889

(22) Filed: Apr. 30, 2007

(65) Prior Publication Data

US 2007/0255479 A1 Nov. 1, 2007

(30) Foreign Application Priority Data

Apr. 29, 2006 (DE) .................. 10 2006 020 063

(51) Int. Cl.
- B60T 8/32 (2006.01)
- G06F 7/00 (2006.01)
- G06F 17/00 (2006.01)
- G05D 1/00 (2006.01)

(52) U.S. Cl. .................. 701/93; 307/10.6; 180/170
(58) Field of Classification Search .................. 701/93; 180/170; 307/10.6
See application file for complete search history.

(56) References Cited

U.S. PATENT DOCUMENTS

| 3,585,378 | A | * | 6/1971 | Bouricius et al. | 714/805 |
| 5,128,947 | A | * | 7/1992 | Corrigan | 714/816 |
| 5,335,743 | A | * | 8/1994 | Gillbrand et al. | 180/178 |
| 5,554,895 | A | * | 9/1996 | Ross et al. | 307/141 |
| 5,881,078 | A | * | 3/1999 | Hanawa et al. | 714/823 |
| 6,078,859 | A | | 6/2000 | Jastrzebski et al. | |
| 6,246,129 | B1 | | 6/2001 | Schaefer | |
| 2002/0133285 | A1 | | 9/2002 | Hirasago | |
| 2003/0028310 | A1 | * | 2/2003 | Schmitz et al. | 701/93 |
| 2004/0217649 | A1 | * | 11/2004 | Rouleau | 307/10.1 |
| 2005/0006165 | A1 | * | 1/2005 | Scherl et al. | 180/271 |
| 2005/0247497 | A1 | * | 11/2005 | Pendleton | 180/170 |
| 2005/0257976 | A1 | * | 11/2005 | Moczydlowski | 180/170 |
| 2006/0031643 | A1 | * | 2/2006 | Figueira | 711/154 |
| 2006/0131963 | A1 | * | 6/2006 | Katrak et al. | 307/134 |
| 2006/0167565 | A1 | * | 7/2006 | Katrak et al. | 700/12 |
| 2007/0168837 | A1 | * | 7/2007 | Murin | 714/763 |
| 2007/0255479 | A1 | * | 11/2007 | Gruenter et al. | 701/93 |

FOREIGN PATENT DOCUMENTS

| DE | 103 10 719 A1 | 9/2004 |
| GB | 2 382 158 A | 5/2003 |
| JP | 2004106708 | 4/2004 |

* cited by examiner

*Primary Examiner*—Khoi Tran
*Assistant Examiner*—Jaime Figueroa

(57) ABSTRACT

A cruise control device has an activation device embodied as a key button. By activating the activation device it is possible to transfer the cruise control device, from a switched off operating state to a switched on standby operating state, and by a further activation of the activation device it is possible to transfer the cruise control device from the standby operating state to a switched on control operating state. The cruise control device has a storage device storing a state of the cruise control device immediately before the motor vehicle is switched off and a readout device which reads out the stored state of the cruise control device immediately after the motor vehicle is switched on. If the cruise control device had a switched on operating state immediately before the ignition device is last switched off, the cruise control device is transferred automatically to the standby operating state.

5 Claims, 1 Drawing Sheet

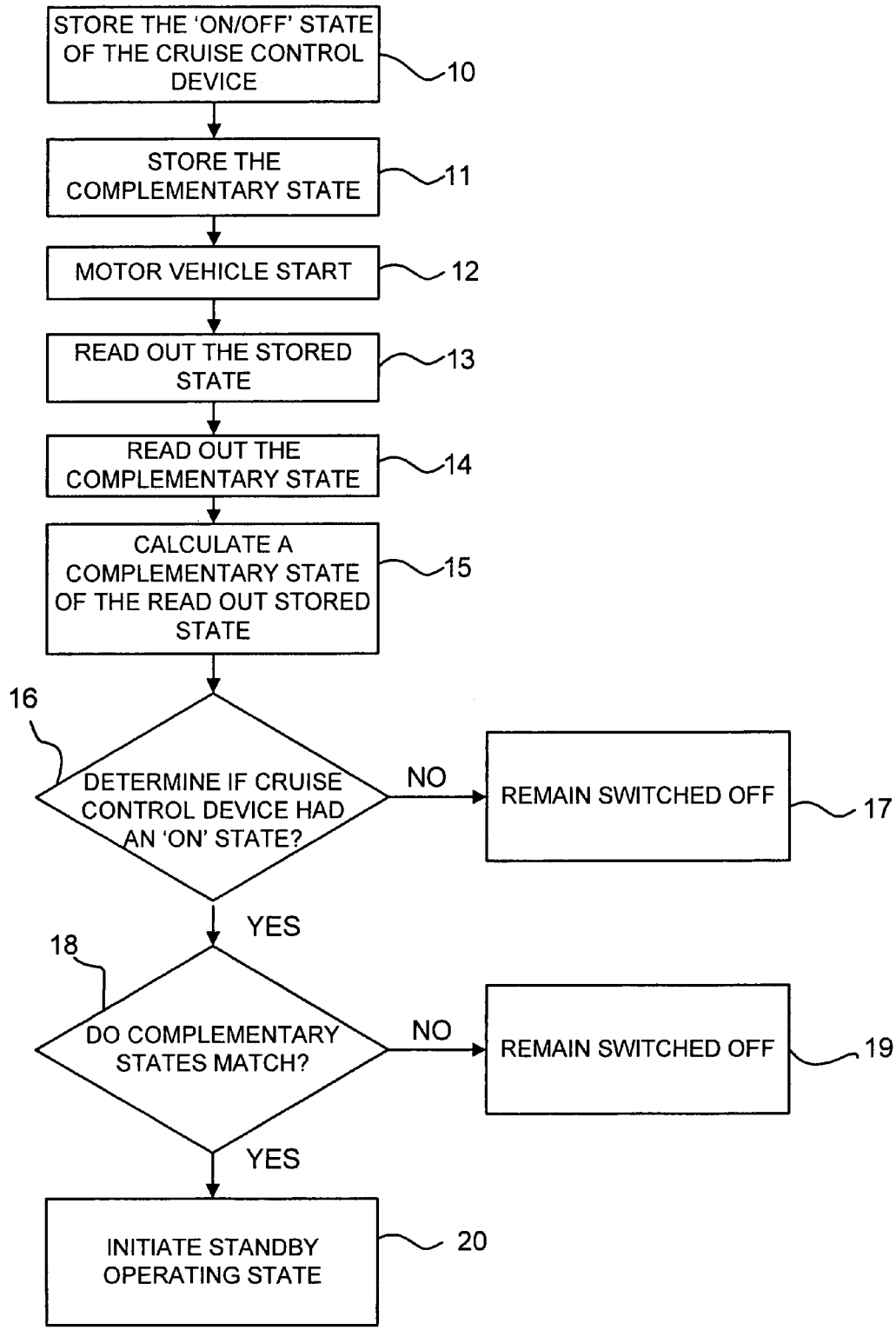

CRUISE CONTROL DEVICE

CROSS-REFERENCE TO RELATED APPLICATION

This application claims the priority, under 35 U.S.C. §119, of German application DE 10 2006 020 063, filed Apr. 29, 2006; the prior application is herewith incorporated by reference in its entirety.

BACKGROUND OF THE INVENTION

Field Of The Invention

The invention relates to a cruise control device for a motor vehicle.

A cruise control device is referred to as a tempostat or tempomat. Cruise control devices which are known from practice have an activation device which is attached to a steering column assembly of a motor vehicle, wherein by activating the activation device the cruise control device can be transferred from a switched off operating state into a switched on standby operating state. By a further activation of the activation device it is possible to transfer the cruise control device from the switched on standby state to a switched on control operating state, wherein, in the control operating state, in particular the velocity which is to be maintained or regulated, can be set. Accordingly, a cruise control device cannot be transferred immediately from the switched off operating state into the control operating state but rather only from the switched on standby operating state.

From practice, cruise control devices are known whose activation device is embodied as an indexing mechanism. Cruise control devices with an activation device which is embodied as an indexing mechanism have the advantage that after the activation device has been activated to transfer the cruise control device from the switched off operating state into the switched on standby operating state the activation device of the cruise control device remains in the corresponding latched position. The latched position of an activation device which is embodied as an indexing mechanism, for a cruise control device, can be read in during or after the ignition of a motor vehicle so that the cruise control device can be transferred automatically into the standby operating state as a function of the latched position of the activation device. This increases the convience for a driver since the cruise control device does not have to transfer manually from the switched off operating state into the switched on standby operating state. However, for esthetic reasons, it is frequently not desired to use an activation device which is embodied as an indexing mechanism.

Furthermore, cruise control devices whose activation device is embodied as a key button are known from practice. After an activation device which is embodied as a key button is activated, it returns, in contrast to an activation device which is embodied as an indexing mechanism, automatically to its initial state, for which reason the key buttons are preferred over indexing mechanisms for esthetic reasons. However, when or after a motor vehicle starts, it is not possible to read in a switched state in an activation device which is embodied as a key button, for which reason after each starting of the motor vehicle it is again necessary to transfer the cruise control device manually from the switched off operating state into the switched on standby operating state by activating the activation device. This will be felt to be inconvenient by drivers who know cruise control devices with an activation device which is embodied as an indexing mechanism.

SUMMARY OF THE INVENTION

It is accordingly an object of the invention to provide a cruise control device which overcomes the above-mentioned disadvantages of the prior art devices of this general type, which combines the advantages of a cruise control device with an activation device being a key button with the advantages of a cruise control device with an indexed activation device.

With the foregoing and other objects in view there is provided, in accordance with the invention a cruise control device for a motor vehicle. The cruise control device contains an activation device attached to a steering column assembly or a steering wheel of the motor vehicle and is embodied as a key button. By activating the activation device it is possible to transfer the cruise control device, from a switched off operating state into a switched on standby operating state, and by a further activation of the activation device it is possible to transfer the cruise control device from the switch on standby operating state to a switched on control operating state. A storage device is provided for storing a stored state of the cruise control device and is coupled to the activation device. The stored state reflects whether the cruise control device assumes the switched off operating state or a switched on operating state being either the switched on standby operating state or the switched on control operating state, immediately before or when an ignition device of the motor vehicle is switched off. A readout device is coupled to the storage device for reading out the stored state of the cruise control device from the storage device when or immediately after the ignition device of the motor vehicle is switched on, and if according to a read out state of the stored state, the cruise control device had the switched on operating state immediately before or when the ignition device is last switched off, the cruise control device is transferred automatically to the switched on standby operating state.

The cruise control device contains a storage device which stores a state of the cruise control device, specifically whether the cruise control device assumes a switched on operating state, specifically the standby operating state or the switched on control operating state, immediately before or when an ignition device of the motor vehicle is switched off. The cruise control device further has a readout device which reads out the stored state of the cruise control device from the storage device when or immediately after the ignition device of the motor vehicle is switched on. If according to the read out state, the cruise control device had assumed a switched on operating state immediately before or when the ignition device is last switched off, the cruise control device can be transferred automatically to the switched on standby operating state.

With the invention it is possible to make available the same functionality in a cruise control device which has an activation device embodied as a key button as in a cruise control device having an activation device which is embodied as an indexing mechanism. As a result, the convenience of cruise control devices which have an activation device which is embodied as a key button can be increased.

In accordance with an added feature of the invention, the storage device further stores a complementary state of the stored state as to whether the cruise control device assumed the switch off operating state or the switched on operating state immediately before or when an ignition device of the motor vehicle is switched off.

In accordance with an additional feature of the invention, the readout device reads out the complementary state from the storage device when or immediately after the ignition device is switched on.

In accordance with a further feature of the invention, a calculation device is provided for calculating a calculated complementary state of the stored state for the cruise control device which has been read out from the storage device.

In accordance with a concomitant feature of the invention, an evaluation device is provided for comparing the calculated complementary state with the complementary state stored in the storage device when or immediately after the ignition device is switched on, and in dependence on a result of a comparison, the cruise control device can be transferred automatically to the switched on standby operating state only if the calculated complementary state corresponds to the complementary state.

Other features which are considered as characteristic for the invention are set forth in the appended claims.

Although the invention is illustrated and described herein as embodied in a cruise control device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The single FIGURE of the drawing is a flow chart clarifying a method of functioning of a cruise control device according to the invention.

DESCRIPTION OF THE PREFERRED EMBODIMENTS

The present invention relates to a cruise control device for a motor vehicle, with the cruise control device having an activation device which is attached to a steering column or a steering wheel of the motor vehicle.

The activation device is embodied here as a key buttoned, wherein by activating the activation device it is possible to transfer the cruise control device, from a switched off operating state to a switched on standby operating state. By a further activation of the activation device it is possible to transfer the cruise control device from the switched on standby operating state into a switched on control operating state, wherein, in the control operating state, in particular the velocity to be regulated by the cruise control device can be set.

According to the invention, the cruise control device contains a storage device which stores a state of the cruise control device, specifically the state as to whether the cruise control device assumes a switched on operating state immediately before or when an ignition device of the motor vehicle is switched off. The switched on operating state can be understood to mean both the standby operating state and the control operating state.

Storing the state of the cruise control device in the storage device is represented by block 10 in the diagram of the FIGURE.

If the cruise control device assumes a switched on operating state immediately before or when the ignition device is switched off, the logic state "1" can then preferably be stored in the storage device. If, on the other hand, the cruise control device assumes a switched off operating state immediately before or when the ignition device is switched off, the logic state "0" can preferably be stored in the storage device as shown by block 10.

The storage device of the cruise control device according to block 11 preferably also stores a complement to the state stored in block 10. If, afterwards, the storage device stores the logic state "1" in block 10 when the cruise control device is in a switched on operating state immediately before or when the ignition device is switched off, the storage device stores the logic state "0" in block 11 as a complement. Then, on the other hand, if the storage device has stored the logic state "0" in block 10 when there is a cruise control device which is switched off, the storage device in block 11 stores the logic state "1" as the complement.

Furthermore, the cruise control device according to the invention has a readout device which reads out the stored state of the cruise control device from the storage device when or immediately after the ignition device of the motor vehicle is switched on. In the FIGURE, the starting of the ignition device is represented by the block 12. The reading out of the state which is stored in the storage device according to block 10 is represented by block 13.

When or immediately after the ignition device of the motor vehicle is switched on, the readout device preferably reads, according to block 13, not only the state of the cruise control device stored in the storage device according to block 10 but also reads, according to block 14, the component of the state of the cruise control device which is stored according to block 11.

Furthermore, the cruise control device according to the invention preferably has a calculation device which calculates the complement of the stored state in the sense of the block 15 from the stored state of the cruise control device which is read out from the storage device according to block 13.

In addition to the storage device, the read out device and preferably the calculation device, the cruise control device has an evaluation device with which the state of the cruise control device which is read out from the storage device according to block 13 can be evaluated. Then, if according to the stored state read out in block 13, the cruise control device had assumed a switched on operating state immediately before or when the ignition device of the motor vehicle is last switched off, the cruise control device can be transferred automatically into the switched on standby operating state. Then, if, on the other hand, according to the stored state read out in block 13 the cruise control device had assumed a switched off operating state immediately before or when the ignition device is last switched off, the cruise control device is not transferred automatically into the switched on standby operating state but rather left in the switched off operating state.

The above evaluation of the stored state of the cruise control device which is read out from the storage device in block 13 is represented in the FIGURE by blocks 16, 17 and 20, while in block 16 it is determined whether, after the stored state which has been read out according to block 13, the cruise controller device had assumed a switched on operating state immediately before or when the ignition device is last switched off.

If this is not the case, according to block 17 the cruise controller device remains in the switched off operating state. On the other hand, if this is the case, the cruise control device can, according to block 20, be transferred automatically into the switched on standby operating state.

As already mentioned above, the stored complement of the stored state of the cruise control device can preferably be read out from the storage device in block 14, while in block 15 a complement can be calculated from the stored state of the cruise control device which has been read out in block 13 and stored in the storage device.

Then, using the evaluation device it is preferably checked when or immediately after the ignition device is switched on, whether the complement calculated according to block 15 corresponds to the stored complement read out according to block 14. This comparison is carried out in block 18 in the FIGURE.

If the result of this comparison is positive, that is to say if the calculated complement corresponds to the stored complement, the cruise control device can, according to block 20, be transferred automatically to the switched on standby operating state.

If, on the other hand, the result of this comparison is negative, that is to say the calculated complement does not correspond to the read out complement, the cruise control device is not transferred automatically into the switched on standby operating state but instead remains, according to block 19, in a switched off operating state.

The above-mentioned devices of the cruise control device according to the invention, specifically the storage device, the read out device, the calculation device and the evaluation device, can be integrated either into the engine controller device of the motor vehicle, which is also referred to as DME (Digitale Motor Elektronik [Digital Engine Electronics]) or integrated into a control device which is assigned to the steering column assembly of the motor vehicle.

We claim:

1. A cruise control device for a motor vehicle, the cruise control device comprising:
    an activation device attached to one of a steering column assembly and a steering wheel of the motor vehicle and is a key button, by activating said activation device it is possible to transfer the cruise control device, from a switched off operating state into a switched on standby operating state, and by a further activation of said activation device it is possible to transfer the cruise control device from the switch on standby operating state to a switched on control operating state;
    a storage device storing a stored state of the cruise control device and coupled to said activation device, the stored state reflecting whether the cruise control device assumes the switched off operating state or a switched on operating state being either the switched on standby operating state or the switched on control operating state, immediately before or when an ignition device of the motor vehicle is switched off; and
    a readout device coupled to said storage device for reading out the stored state of the cruise control device from said storage device when or immediately after the ignition device of the motor vehicle is switched on, and if according to a read out state of the stored state, the cruise control device had the switched on operating state immediately before or when the ignition device is last switched off, the cruise control device being transferred automatically to the switched on standby operating state.

2. The cruise control device according to claim 1, wherein said storage device further stores a complementary state of the stored state as to whether the cruise control device assumed the switch off operating state or the switched on operating state immediately before or when an ignition device of the motor vehicle is switched off.

3. The cruise control device according to claim 2, wherein said readout device reads out the complementary state from said storage device when or immediately after the ignition device is switched on.

4. The cruise control device according to claim 3, further comprising a calculation device for calculating a calculated complementary state of the stored state for the cruise control device which has been read out from said storage device.

5. The cruise control device according to claim 4, further comprising an evaluation device comparing the calculated complementary state with the complementary state stored in said storage device when or immediately after the ignition device is switched on, and in dependence on a result of the comparing, the cruise control device is transferred automatically to the switched on standby operating state only if the calculated complementary state corresponds to the complementary state.

* * * * *